US009009041B2

(12) United States Patent
Zavaliagkos et al.

(10) Patent No.: US 9,009,041 B2
(45) Date of Patent: Apr. 14, 2015

(54) SYSTEMS AND METHODS FOR IMPROVING THE ACCURACY OF A TRANSCRIPTION USING AUXILIARY DATA SUCH AS PERSONAL DATA

(75) Inventors: George Zavaliagkos, Lexington, MA (US); William F. Ganong, III, Brookline, MA (US); Uwe H. Jost, Maidenhead (GB); Shreedhar Madhavapeddi, Seattle, WA (US); Gary B. Clayton, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 858 days.

(21) Appl. No.: 13/190,749

(22) Filed: Jul. 26, 2011

(65) Prior Publication Data

US 2013/0030804 A1 Jan. 31, 2013

(51) Int. Cl.
*G10L 15/00* (2013.01)
*G10L 15/26* (2006.01)
*G10L 15/24* (2013.01)
*G10L 15/22* (2006.01)
*G10L 15/08* (2006.01)
*G10L 15/30* (2013.01)

(52) U.S. Cl.
CPC ............ *G10L 15/26* (2013.01); *G10L 2015/227* (2013.01); *G10L 15/08* (2013.01); *G10L 15/24* (2013.01); *G10L 15/30* (2013.01)

(58) Field of Classification Search
CPC . G10L 15/265; G10L 15/22; H04M 2201/40; H04M 2201/60; G06F 17/30746
USPC ........................................................ 704/235
See application file for complete search history.

(56) References Cited

U.S. PATENT DOCUMENTS

| | | | |
|---|---|---|---|
| 6,173,259 B1 * | 1/2001 | Bijl et al. ....................... | 704/235 |
| 7,027,987 B1 * | 4/2006 | Franz et al. .................... | 704/236 |
| 7,162,422 B1 * | 1/2007 | Bennett ......................... | 704/236 |
| 7,440,900 B2 * | 10/2008 | Chang ........................... | 704/275 |
| 7,590,536 B2 * | 9/2009 | Bates et al. .................... | 704/244 |
| 7,647,225 B2 * | 1/2010 | Bennett et al. ................ | 704/251 |
| 7,899,671 B2 * | 3/2011 | Cooper et al. ................. | 704/252 |
| 7,925,510 B2 * | 4/2011 | Creamer et al. ............ | 704/270.1 |

(Continued)

OTHER PUBLICATIONS

Gollan, Christian, and Michiel Bacchiani. "Confidence scores for acoustic model adaptation." Acoustics, Speech and Signal Processing, 2008. ICASSP 2008. IEEE International Conference on. IEEE, 2008.*

(Continued)

*Primary Examiner* — Pierre-Louis Desir
*Assistant Examiner* — Fariba Sirjani
(74) *Attorney, Agent, or Firm* — Perkins Coie LLP

(57) ABSTRACT

A method is described for improving the accuracy of a transcription generated by an automatic speech recognition (ASR) engine. A personal vocabulary is maintained that includes replacement words. The replacement words in the personal vocabulary are obtained from personal data associated with a user. A transcription is received of an audio recording. The transcription is generated by an ASR engine using an ASR vocabulary and includes a transcribed word that represents a spoken word in the audio recording. Data is received that is associated with the transcribed word. A replacement word from the personal vocabulary is identified, which is used to re-score the transcription and replace the transcribed word.

23 Claims, 8 Drawing Sheets

(56) References Cited

U.S. PATENT DOCUMENTS

| | | | |
|---|---|---|---|
| 7,933,777 B2* | 4/2011 | Koll | 704/270.1 |
| 8,005,674 B2* | 8/2011 | Janke et al. | 704/238 |
| 8,019,608 B2* | 9/2011 | Carraux et al. | 704/270.1 |
| 8,024,194 B2* | 9/2011 | Cross et al. | 704/270 |
| 8,229,743 B2* | 7/2012 | Carter et al. | 704/251 |
| 8,290,126 B2* | 10/2012 | Chatterjee et al. | 379/88.19 |
| 8,600,742 B1* | 12/2013 | Gruenstein | 704/231 |
| 8,676,577 B2* | 3/2014 | Jablokov et al. | 704/235 |
| 8,892,439 B2* | 11/2014 | Odell et al. | 704/257 |
| 2002/0165716 A1* | 11/2002 | Mangu et al. | 704/255 |
| 2005/0125224 A1* | 6/2005 | Myers et al. | 704/231 |
| 2005/0131677 A1* | 6/2005 | Assadollahi | 704/201 |
| 2005/0137866 A1* | 6/2005 | Dow et al. | 704/244 |
| 2007/0150279 A1* | 6/2007 | Gandhi et al. | 704/258 |
| 2007/0239837 A1* | 10/2007 | Jablokov et al. | 709/206 |
| 2007/0276651 A1* | 11/2007 | Bliss et al. | 704/9 |
| 2008/0312934 A1* | 12/2008 | Cerra et al. | 704/275 |
| 2010/0177877 A1* | 7/2010 | Hamaker et al. | 379/88.14 |
| 2011/0268260 A1 | 11/2011 | Madhavapeddi et al. | |
| 2012/0179464 A1* | 7/2012 | Newman et al. | 704/231 |
| 2014/0278390 A1* | 9/2014 | Kingsbury et al. | 704/232 |

OTHER PUBLICATIONS

U.S. Appl. No. 13/101,909, filed May 5, 2011, Madhavapeddi.
Mangu et al., Finding Consensus in Speech Recognition: Word Error Minimization and Other Applications of Confusion Networks, Computer, Speech and Language, Oct. 2000, 35 pages.

* cited by examiner

Hi Pim. We are going to meet with Taryn at 3pm at Binko's Pizza. Hope you can make it.

Hi Tim. We are going to meet with Karen at 3pm at Bingo's Pizza. Hope you can make it.

Confidence Scores

| Hi | - 1 | to | - 1 | 3pm | - 1 | you | - 1 |
| Tim | - .9 | meet | - 1 | at | - 1 | can | - 1 |
| We | - 1 | with | - 1 | Bingo's | - .85 | make | - 1 |
| are | - .9 | Karen | - .7 | pizza | - 1 | it | - 1 |
| going | - 1 | at | - 1 | Hope | - 1 | | |

Select a Word — 525
Taryn
Karen
Jerry

Hi Pim. We are going to meet with Karen at 3pm at Binko's Pizza. Hope you can make it.

*FIG. 5D*

SYSTEMS AND METHODS FOR IMPROVING THE ACCURACY OF A TRANSCRIPTION USING AUXILIARY DATA SUCH AS PERSONAL DATA

BACKGROUND

A spoken message can be conveyed to a recipient as either audio or text. For example, some mobile devices are able to either play audio of a voicemail or display a transcription of its spoken words. Automatic speech recognition (ASR) engines are used to generate text from spoken words. An ASR engine can evaluate portions of audio against words and select sequences of words that are likely to represent spoken words from the audio.

A number of variables affect the accuracy with which an ASR engine recognizes spoken words. Prominent among these factors is whether a word exists in the ASR engine's vocabulary. If it does not, the ASR engine will not recognize the word when it is spoken in an audio recording. Additionally, if a word is not frequently used, an ASR engine might misrecognize the word, favoring one that is statistically more likely to be spoken. These factors can reduce the accuracy with which an ASR engine recognizes many words. Among the words that are commonly misrecognized are proper names, such as those for people, streets, and restaurants, and other words that have a special relevance in personal messages like voicemails.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 5A is a representative diagram of spoken words from an audio recording.

FIG. 5B is a representative diagram of a transcription of the spoken words from the audio recording.

FIG. 5C is a representative table containing confidence scores associated with the transcription of the audio recording.

FIG. 5D is a representative diagram of a transcription that is presented to a user.

DETAILED DESCRIPTION

Figure 1A:
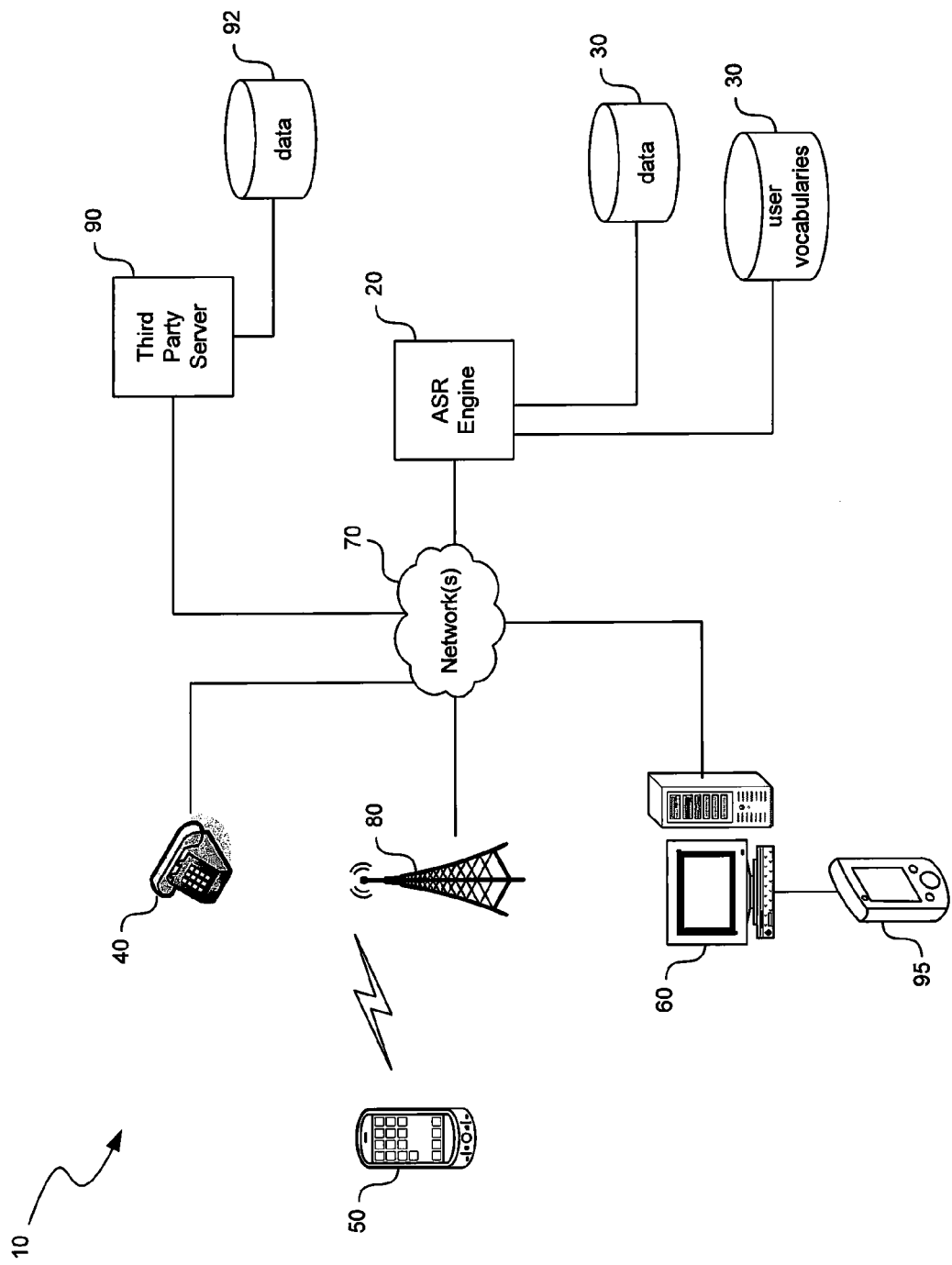
FIG. 1A is a diagram of a suitable environment in which a personal data re-scoring system operates.

One way that an ASR engine could mitigate the problems associated with transcribing a recorded message is by using a vocabulary that has been personalized for the recipient of the message. For example, the ASR engine could be sent personal information about a voicemail recipient for it to consider when transcribing a voicemail. In practice, however, an ASR engine rarely can access personal data associated with a recipient. ASR engines generally operate inefficiently in devices that have access to personal information about a user—such as mobile devices. Instead, most ASR engines exist in powerful computers that receive recordings through a network. And to protect their privacy, people are typically reluctant to share personal information with these systems.

A text processing system is described that operates in a computing device and improves the accuracy of a received transcription (e.g., a text transcription, a word lattice, etc.) using supplemental data (e.g., personal data associated with a user of the device). The personal data re-scoring system operates separately from an ASR engine that generates the transcription. As a result, the personal data re-scoring system can function in devices where an ASR engine would be inefficient or otherwise undesirable, but that can access personal data about a user without raising concerns over privacy.

In a broad sense, the present system includes at least two computers, servers, cell phones, or other data processing devices both running ASR engines or speech recognizers. One computer, such as a server with large computational resources, communicates with a client with less computational resources, but the client has personal data, such as address book information, SMS and email messages, web-based sources, etc. In other words, the client has access to personal data which is unavailable to the server. The client may also have acoustic models (AM) associated with a user of the client (sized to fit on the client, and with AM scores scaled to compare to AM scores of a lattice received from the server). The server recognizes some received speech, and sends to the client a rich-recognition-result, including additional information, such as a word lattice, with separate AM, language model (LM) and confidence scores, and possibly also a phoneme lattice (so the client can align words from personal data with the received rich-recognition-result). The client rescores the rich recognition output, using information derived from the personal data; and presents it to the user, sends the results back to the server, or provides other responses.

An ASR engine transcribes spoken words from an audio recording, such as a voicemail message, and sends the transcription and associated data to the personal data re-scoring system. The transcription may include, for example, text, a word lattice, phoneme lattice, or the like. The personal data re-scoring system maintains a vocabulary that includes replacement words that it derives from supplemental sources, such as personal data associated with the user. In some implementations, the personal data re-scoring system improves the accuracy of the transcription by using personal data and replacement words to recalculate confidence scores associated with the word lattice, finding a path through the lattice that yields a new and more accurate transcription of the spoken words than the transcription generated by the ASR engine. In other implementations, the personal data re-scoring system improves the accuracy of a transcription by favoring personal data and replacing words that were (or may have been) inaccurately transcribed with replacement words that represent more accurate transcriptions of the spoken words from the audio recording.

The personal data re-scoring system often utilizes personal data to improve a transcription. Personal data is data that is associated with the user of a device or an intended recipient or audience of a recording. In some implementations, personal data includes data stored locally in a mobile device or computer. For example, personal data may include data related to the user's contacts, friends, calendar appointments, emails, SMS/MMS messages, or the like. In some implementations, personal data is obtained from remote systems or data storage areas associated with the user. For example, personal data may be gathered from a social networking service or another service provider. The personal data re-scoring system may of course gather words from other supplementary sources. The personal data re-scoring system then builds a supplementary or personal vocabulary data structure from these gathered words.

After the personal data re-scoring system receives a transcription, it attempts to improve the accuracy of the transcription using personal data. In some implementations, the transcription is a "rich-recognition-result," represented in the form of a word lattice containing a general alternate recognition hypotheses, or a recognition result containing the general alternate recognition hypotheses, or the like (See, e.g., L. Mangu, E. Brill and A. Stolcke, Finding Consensus in Speech Recognition: *Word Error Minimization and Other Applications of Confusion Networks, Computer, Speech and Language*, 14(4):373-400 (2000)). The rich-recognition-result may include words that the ASR engine identified as most likely representing accurate transcriptions of the spoken words from the audio. The rich-recognition-result also includes alternative hypotheses about what words or phonemes were spoken, which the ASR engine did not identify as most likely representing accurate transcriptions of the spoken words, but which might be valid alternatives. The rich-recognition-result may include both a word lattice and a phoneme lattice, which the personal data re-scoring system can use to align words derived from personal data with the rich-recognition-result. Further, the rich-recognition-result may also include a separate acoustic model, language model (LM), and/or confidence scores. Thus, the rich-recognition-result may include a rich data set produced from the ASR engine and that can be useful by a subsequent ASR or rescoring engine, such as a personal data re-scoring system.

The personal data re-scoring system re-scores the rich-recognition-result based on personal data. For example, it may compare words derived from the personal data to words or phonemes from the rich-recognition-result to adjust confidence scores associated with the words of the rich-recognition-result. The personal data re-scoring system may utilize a local or smaller ASR engine that has access to personal data to transcribe the audio or portions thereof to modify the rich-recognition-result and/or to adjust confidence scores associated with words of the rich-recognition-result. The personal data re-scoring system can then re-evaluate the rich-recognition-result, by, for example, finding a new path through the lattice that yields a transcription of the spoken words that is more accurate than the words originally identified by the ASR engine.

The personal data re-scoring system can improve the accuracy of a transcription in a number of ways. In some implementations, the personal data re-scoring system identifies a word from a transcription whose confidence score is below a threshold level. Once a word is identified, the personal data re-scoring system searches a vocabulary that includes words derived from personal data for a replacement word that is more likely than the identified word to be an accurate transcription of the spoken word from the recording. In some implementations, a local ASR engine transcribes audio data of the spoken word using the personal data re-scoring system's vocabulary. The personal data re-scoring system favors the replacement word generated by the local ASR engine if a confidence score associated with the replacement word is greater than that of the identified word from the transcription. In some implementations, the personal data re-scoring system favors a replacement word over the identified word if the replacement word is heavily weighted and is phonetically similar to the identified word. If the personal data re-scoring system determines that a replacement word is more likely than the identified word to be an accurate transcription of the spoken word, it replaces the identified word with the replacement word.

In some implementations, the personal data re-scoring system creates a rule based on the replacement of an identified word, which the personal data re-scoring system follows to improve subsequent transcriptions. The personal data re-scoring system may send the ASR engine the rule and/or a report detailing the replacement of the identified word. In some implementations, the personal data re-scoring system permits a user to manually correct an incorrect transcription, and the system saves that correction to improve future transcriptions. In some implementations, the user may grant the personal data re-scoring system permission to send data to the ASR engine.

The personal data re-scoring system can provide a personalized transcription of a recording without a person having to share personal data with a remote system. The personal data re-scoring system may gather personal data and store it locally, though it may also share the personal data with remote systems upon express approval of the user. By storing and using personal data locally, the user receives a greater level of comfort, confident that his or her personal data will not be stolen, gathered for advertising purposes, or otherwise used in a manner that he or she would not have allowed.

As discussed herein, personal data may be gathered from the user's use of a mobile device or from remote systems in order to create or add words to a personal vocabulary. When the personal data re-scoring system is initialized on the mobile device, it may search local storage areas or remote storage areas for personal data. Stored locally on the mobile device may be SMS/MMS messages, twitter feeds, email messages, contact information, calendar information, application information (e.g., data gathered by other applications operating on the mobile device, such as a Skype™ application), or the like. The personal data re-scoring system may also search remote storage areas associated with the user. For example, the personal data re-scoring system may include a wizard or search engine that searches a user's mobile device or computer for local repositories, files or data structures that may contain terms to be added to the personal vocabulary, such as locally stored contacts, e-mail accounts, documents stored in remote servers (e.g., Google docs) and so forth, and ask the user as to which of these the system should scan to identify new terms. Likewise, the wizard/search engine can query the user for which external data repositories the system could analyze to identify terms for the personal vocabulary, such as asking the user if she has a Facebook account, a twitter account, subscribes to RSS feeds, etc., and prompt the user for details. Further, the wizard/search engine may prompt user to enter login information associated with these accounts, such as for a social networking site or email account, which the wizard or search engine uses to automatically access those accounts and retrieve messages, contact information, etc. In some implementations, the wizard or search engine is able to search these accounts for words to add to a personal vocabulary using login information already store in the mobile device.

The personal data re-scoring system can gather personal data upon initialization of the personal data re-scoring system, as described above, and it can gather personal data as a user uses the mobile device. For example, the personal data re-scoring system can continuously monitor the user's use of the mobile device or periodically examine changes made to data stored on the mobile device through the user's use. Similarly, the personal data re-scoring system can monitor personal data on the mobile device at specific instances, such as when an SMS message is sent or received, a website is accessed via a browser, a new contact is stored in the mobile device, or the like. The personal data re-scoring system can also gather information stored remotely through the user's use of the mobile device. For example, if a user does not wish to provide the personal data re-scoring system with login information for social networking or email accounts, the personal data re-scoring system may monitor the information being downloaded from remote storage areas onto the mobile device as the user accesses this data. From this data, it may identify words to be added to a personal vocabulary. For example, as the user accesses a Facebook® account, either through a web browser or a dedicated application, the personal data re-scoring system may glean personal data from the data received from the remote storage areas associated with the Facebook® account.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

The following discussion includes examples of a system that generates a personal vocabulary and processes a transcription received from an ASR engine using the personal vocabulary, improving the accuracy of the transcription. The system is described with respect to a number of processes that it may implement and numerous examples of how it may determine to replace a word of a transcription with one it determines is a more accurate representation of a spoken word.

Suitable Environments

FIG. 1A and the following discussion provide a brief, general description of a suitable computing environment 10 in which a personal data re-scoring system for improving the accuracy of a transcription can be implemented. Although not required, aspects and implementations of the invention will be described in the general context of computer-executable instructions, such as routines executed by a general-purpose computer or a mobile device, e.g., a personal computer or smartphone. Those skilled in the relevant art will appreciate that the invention can be practiced with other computer system configurations, including Internet appliances, set-top boxes, hand-held devices, wearable computers, mobile phones, laptops, netbooks, tablets, multiprocessor systems, microprocessor-based systems, minicomputers, mainframe computers, or the like. The invention can be embodied in a special purpose computer or data processor that is specifically programmed, configured, or constructed to perform one or more of the computer-executable instructions explained in detail below. Indeed, the terms "computer" and "computing device," as used generally herein, refer to devices that have a processor and non-transitory memory, like any of the above devices, as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium or non-transitory medium for data. Software may include one or more program modules which include routines, programs, objects, components, data structures, and so on that perform particular tasks or implement particular abstract data types.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described below may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 1A, a personal data re-scoring system operates in a computing device, such as a mobile device 50 or a computer 60, and improves the accuracy of a transcription generated by an ASR engine 20. The mobile device 50 and computer 60 include a communications port, such as a network card or another device that enables them to communicate through one or more networks 70. The mobile device 50 and computer 60 communicate via the network with the ASR engine 20. The ASR engine 20 operates in a computer and receives an audio recording, such as a voicemail, and generates a transcription of the recording that represents spoken words from the audio. Data storage area 30 contains data pertaining to the ASR engine and software necessary to generate text representing the spoken words of an audio recording. For example, the data storage area 30 may contain a vocabulary used by the ASR engine to recognize spoken words. Data storage area 30 may also include a vocabulary built by the ASR engine from words identified by the personal data re-scoring system. For example, after the personal data re-scoring system identifies a word that it determines is more likely to be an accurate transcription of a spoken word, it may send data pertaining to that transcription, including the replacement word, to the ASR engine 20, which stores the word in the data storage area 30. After it generates a transcription of an audio recording, the ASR engine 20 sends the transcription to the personal data re-scoring system operating in the mobile device 50 or computer 60, along with data associated with the transcription and/or the audio recording.

The audio recording that the ASR engine 20 transcribes may be recorded and sent to the ASR engine 20 using any of a number of devices, including the mobile device 50, the computer 60, a landline telephone 40, or a portable media player 95, or another device capable of recording audio and/or sending previously recorded audio through the networks 70 such as a gaming console, set top box, tablet computer, voice messaging system, etc. The telephone 40 communicates with the ASR engine 20 through the networks 70, including, for example, a public switched telephone network (PSTN). The mobile device 50 communicates wirelessly with a base station or access point 80 using a wireless mobile telephone standard, such as the Global System for Mobile Communications (GSM), or another wireless standard, such as IEEE 802.11, and the base station or access point 80 communicates with the ASR engine 20 via the networks 70. The computer 60 communicates with the ASR engine 20 through the networks 70 using, for example, TCP/IP protocols. The media player 95 connects to the computer 60 via a wireless communication standard, such as Bluetooth®, or a wired connection, such as a Universal Serial Bus (USB) connection. The mobile device 50 and computer 60 also communicate via the networks 70 with third-party servers 90 that store personal data in data storage areas 92, such as data related to a social networking service. Overall, each of these devices has one or more communications ports for exchanging signals and data with the device.

Personal Data Re-Scoring Systems

Figure 1B:
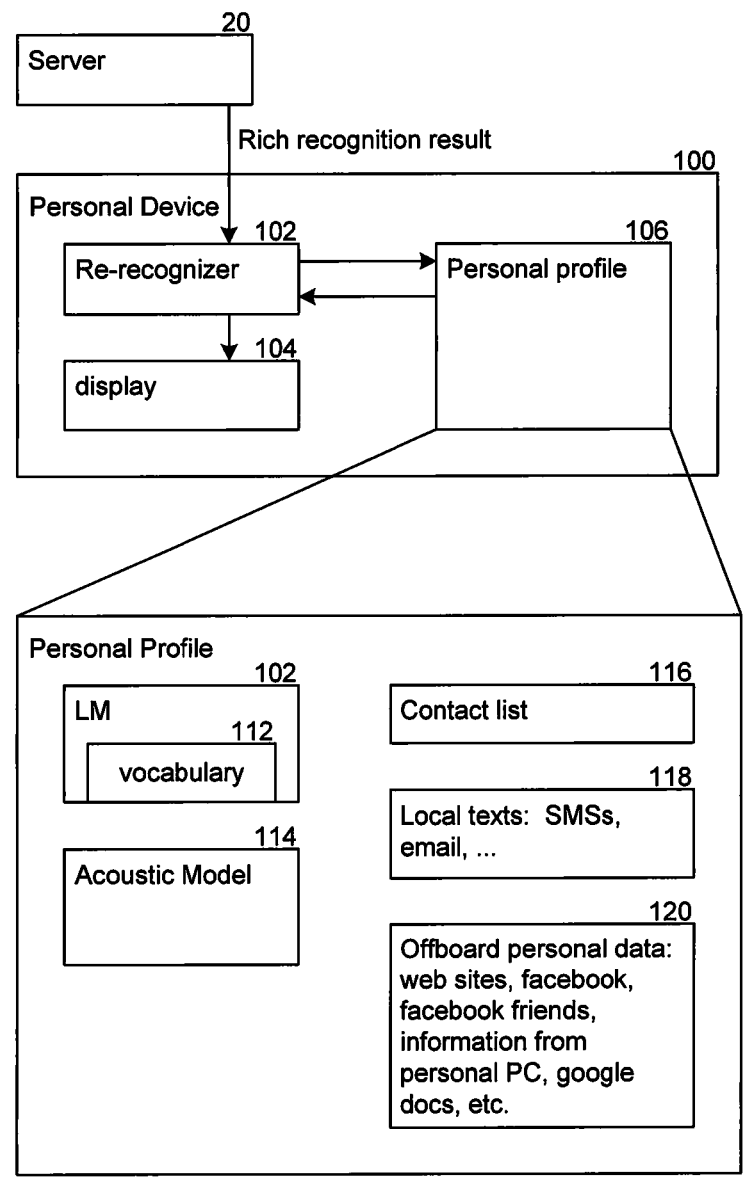
FIG. 1B is a block diagram illustrating an example of a personal device that may implement a personal data re-scoring system.

FIG. 1B shows an example of a personal data re-scoring system, which receives a rich-recognition-result from the server 20, and provides it to a personal device 100. The personal device 100 can be any of the devices shown in FIG. 1A, or otherwise described herein. The personal device includes a display 104 for displaying data, and a re-recognizer 102. The re-recognizer may be an ASR engine locally running on the personal device, or otherwise accessible by the personal device if stored/executed elsewhere. The re-recognizer may be a smaller ASR engine than that of the server, and thus can require less processing cycles, less CPU power, or otherwise have reduced functionality to that of the ASR engine on the server.

A personal profile 106 stored in memory of the personal device 100 includes data and data structures personal or particular to a user of the personal device, and described in detail herein. The personal profile can include a language model 110 with associated vocabulary 112, and include one or more acoustic models 114, all common in most speech recognition systems. The acoustic models (AM) and other data are associated with a user of the personal device and stored on the device may be appropriately modified from those typically used by a larger ASR engine that has greater functionality. For example, the AM can be sized to fit within memory of the personal device, and with AM scores scaled to compare to AM scores of a lattice received from the server/ASR engine.

The personal profile also stores or has access to a contact list 116 associated with the personal device or with a user of the device. The personal profile may include local texts 118, such as e-mails, SMS/MMS texts, are other text-based communications (or include a database/index of such text-based communications). The personal profile may also include off-board personal data 120, such as website data, Facebook data, Facebook friend data (such as communications with friends), information from personal computing devices, data from Internet accessible documents (e.g. Google docs), and so forth. In general, data stored in or by the personal profile 106 is not available to the server 20. While shown generally in FIG. 1B is being stored on the personal device 100, some or all of the personal profile data may be stored remotely, but accessible by the personal device. Further details are provided below.

Figure 2:
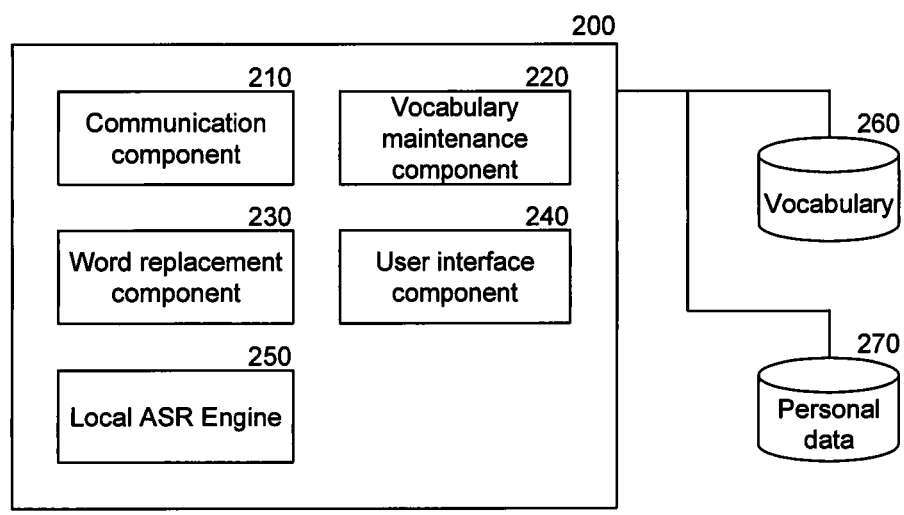
FIG. 2 is a block diagram of the personal data re-scoring system.

FIG. 2 is a block diagram of an example of some components of a personal data re-scoring system 200, although some components may be omitted, while others added beyond those described below. The personal data re-scoring system 200 receives, via a communications port (e.g. wireless radio, Ethernet port, etc.) a transcription received rich data set (including, e.g., a rich-recognition-result) that was generated by an ASR engine from an audio recording (such as the ASR engine 20 on a network server). It attempts to improve the transcription's accuracy by re-scoring the rich-recognition-result and finding a new and more accurate transcription of the audio, by replacing words that it determines were misrecognized with replacement words that it determines are more likely to represent accurate transcriptions of the audio recording, and in other ways that are described herein. The personal data re-scoring system identifies replacement words in personal data associated with a user (e.g., the intended recipient of the audio recording). The personal data re-scoring system 200 includes a communication component 210, a vocabulary maintenance component 220, a word replacement component 230, and a user interface component 240. In some implementations, the personal data re-scoring system 200 also includes a local ASR engine 250.

The communication component 210 receives the transcription of the audio recording from the ASR engine and any data associated with the transcription or the recording, such as confidence scores associated with words in the transcription. The communication component 210 also sends data to the ASR engine that describes any changes that the personal data re-scoring system 200 has made to the received transcription. For example, the word replacement component 230 may generate a report or log that describes or lists the words from the transcription that were replaced and their replacements.

The vocabulary maintenance component 220 identifies personal data and creates and maintains a vocabulary that includes replacement words that are derived from the personal data. (Unless the context requires otherwise, the term "personal data" is intended to also include all supplemental data the system uses to create the vocabulary or improve the accuracy of the transcription.) The vocabulary maintenance component 220 obtains personal data from both local and remote sources. For example, if the personal data re-scoring system 200 is implemented in a mobile device, the vocabulary maintenance component searches for personal data stored in the mobile device. The vocabulary maintenance component 220 also gathers personal data from third party services or other remote data sources, such as social media websites (e.g., Facebook®), email accounts, mobile devices, remote computers, or the like. The vocabulary maintenance component 210 stores personal data that it obtains in a data storage area 270. The vocabulary maintenance component 220 extracts words from personal data and incorporates them in the vocabulary, storing these replacement words in a data storage area 260. The vocabulary maintenance component 220 also stores statistics or other data in association with the replacement words that it adds to the vocabulary. For example, the vocabulary maintenance component 220 may associate a weighting with a replacement word (e.g., a higher weighting for a user replacement or preference for a given word).

The word replacement component 230 attempts to improve the accuracy of transcription using personal data, including the words identified by the vocabulary maintenance component 220. In some implementations, the word replacement component 230 re-scores words and/or phonemes of a rich-recognition-result and finds a new path through the rich-recognition-result to produce a more accurate transcription of the audio recording than the received transcription. In some implementations, the word replacement component 230 identifies words in the transcription that may have been misrecognized by the ASR engine. For example, the word replacement component may identify all words associated with confidence scores below a threshold level.

The word replacement component 230 compares the identified words to replacement words from the vocabulary maintained by the vocabulary maintenance component 220. The word replacement component 230 replaces a word from the transcription with a replacement word when it determines that the replacement word is more likely an accurate transcription of the spoken word from the audio recording. In determining whether to replace a word from the transcription or whether and how much to adjust a score associated with a word or phoneme from the rich-recognition-result, the word replacement component 230 may consider confidence scores associated with the word from the transcription and the replacement words, weightings associated with the replacement words, and other factors. In some implementations, the word replacement component 230 considers the context that a transcribed word was used in, and even if the transcribed word has a high confidence score, the word replacement component 230 replaces the word or re-scores phonemes and/or words of the rich-recognition-result based on the context of the word. For example, the personal data re-scoring system may receive a voicemail transcription that reads, "Hey, John, this is Tim," and the word Tim may be associated with a high confidence score. The personal data re-scoring system may nevertheless replace Tim with Pim, because Pim is the name associated with the contact information of the person who recorded the voicemail. The system may employ the phoneme lattice to align words from personal data with the received rich-recognition-result.

When the word replacement component 230 replaces a word, it generates a report or log entry. The report or log can be a file or any data structure that identifies one or more transcribed words and one or more replaced words, and may include other data (e.g., confidence scores, weightings, etc.). The word replacement component 230 stores the report in the data storage area 260, and it may utilize the report when it processes other transcriptions. For example, based on the report, it may create a rule that a particular word always be replaced by a particular replacement word when it appears in a transcription. Similarly, the communication component 210 may send the report to the ASR engine to be considered during future transcriptions.

The user interface component 240 generates a user interface that includes the transcription. The displayed transcription includes any changes that were made to the transcription by the word replacement component 230. The user interface component 240 allows the user to correct incorrect transcriptions, reverse any changes made to the transcription, add new words to the vocabulary, etc. The user interface component 240 receives commands from the user and stores data submitted by the user. For example, the user may submit a custom transcription for a word, which the user interface component 240 stores in the data storage area 270.

The local ASR engine 250 transcribes spoken words from the audio recording using the vocabulary maintained by the vocabulary maintenance component 220. In some implementations, the ASR engine 250 only transcribes spoken words from a segment of the audio recording, such as a segment that is associated with a word from the transcription with a low confidence score. Transcriptions produced by the local ASR engine 250 may be considered by the word replacement component 230 in identifying and replacing misrecognized words. In some implementations, the local ASR engine 250 uses acoustic models associated with the user to transcribe the audio recording. For example, the acoustic model may be sized to use on a mobile device and may use acoustic model scores that are scaled so that they compare to the acoustic model scores of a received rich-recognition-result.

Suitable Processes

Figure 3:
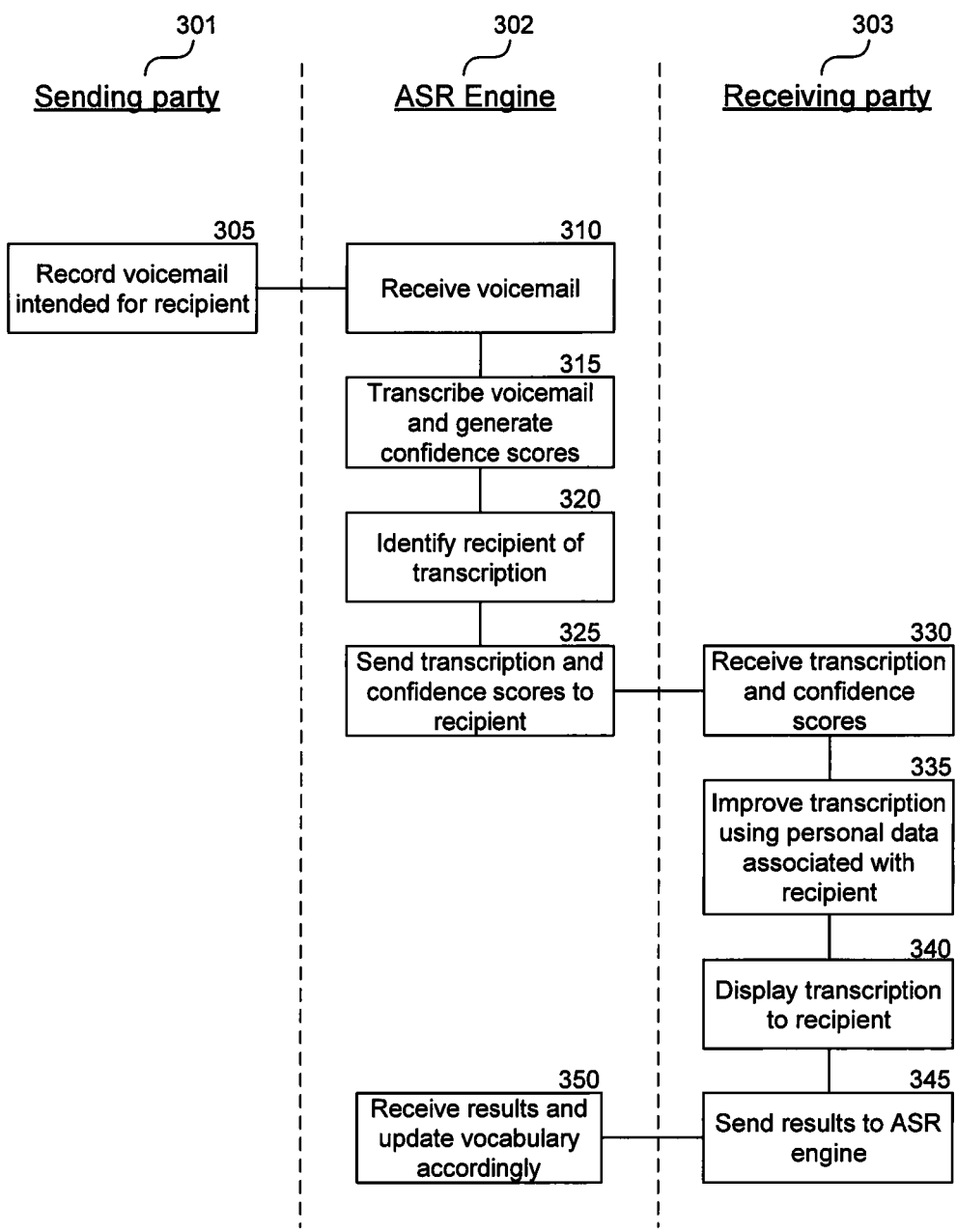
FIG. 3 is a process flow diagram depicting a scenario in which the personal data re-scoring system operates in a mobile device and improves the accuracy of a voicemail transcription.

One application for the personal data re-scoring system 200 is in a mobile device for improving the accuracy of a received voicemail transcription. FIG. 3 is a flow diagram representing a scenario in which the personal data re-scoring system 200 operates in a mobile device and improves the accuracy of a voicemail transcription. At block 305, a sending party 301 places a telephone call to a mobile device carried by a receiving party 303. The sending party records a voicemail message after the receiving party 303 does not answer the call. The voicemail recording is sent to an ASR engine 302, which operates on a computer that communicates via a wireless network with the mobile device carried by the receiving party.

At block 310, the ASR engine 302 receives the voicemail recording. The ASR engine 302 analyzes the audio and other data associated with the recording to identify spoken words from the voicemail. At block 315, the ASR engine generates a voicemail transcription (including, e.g., a rich-recognition-result) containing the spoken words that it identifies. It also produces data related to the transcription, including confidence scores. A confidence score is associated with a word or phrase from the transcription and represents how confident the ASR engine is that it identified the actual word that was spoken by the sender of the voicemail. In some implementations, the ASR engine uses a generic vocabulary for a given language (e.g., English) to transcribe a recording, while in other implementations, the ASR engine uses a vocabulary that has been updated with words derived from personal data about or associated with a user. For example, as detailed below, in some implementations, the personal data re-scoring system 200 sends a report back to the ASR engine that details any changes made to a transcription.

At block 320, the ASR engine 302 identifies the intended recipient of the transcription. Here, the intended recipient is the receiving party 303, represented by the phone number called by the sending party at block 305. At block 325, the ASR engine 302 sends the transcription and associated data to the mobile device carried by the receiving party 303. The associated data can include calling party data (e.g., sending party's phone number or other electronic address, GPS data of sending party's current location, etc). In some implementations, the ASR engine 302 sends the transcription to the recipient through email or SMS/MMS message. In some implementations, the ASR engine sends the data to a third party who delivers it or otherwise makes it available to the intended recipient.

At block 330, the mobile device carried by the receiving party 303 receives the transcription, confidence scores, and data associated with the transcription and/or the voicemail. At block 335, the personal data re-scoring system 200 processes the transcription in an attempt to improve its accuracy. As discussed in further detail below with respect to FIGS. 4A and 4B, the personal data re-scoring system 200 maintains a vocabulary that includes words derived from personal data associated with the receiving party. The personal data re-scoring system 200 improves the transcription's accuracy by replacing a misrecognized word with a word from this vocabulary and/or re-scoring words of a word lattice and identifying a more accurate transcription based at least in part on the personalized vocabulary.

After the personal data re-scoring system 200 has processed the transcription, at block 340, it displays the transcription on the receiving party's mobile device. If words were replaced, their changes are reflected in this transcription. As discussed below with reference to FIGS. 4A, 4B, and 6, in some implementations, the personal data re-scoring system 200 identifies the changes that it made to the transcription and permits the receiving party 303 to correct any incorrect transcriptions. At block 345, the personal data re-scoring system sends a report to the ASR engine 302 that identifies the words from the transcription were replaced and their replacement words. In some implementations, the personal data re-scoring system 200 seeks permission from the receiving party before sending the report to the ASR engine. At block 350, the ASR engine 302 receives the report and analyzes the changes that the personal data re-scoring system 200 made to the transcription. Based on the contents of the received report, the ASR engine 302 modifies the vocabulary that it uses to transcribe voicemail messages sent to the receiving party.

Figure 4A:
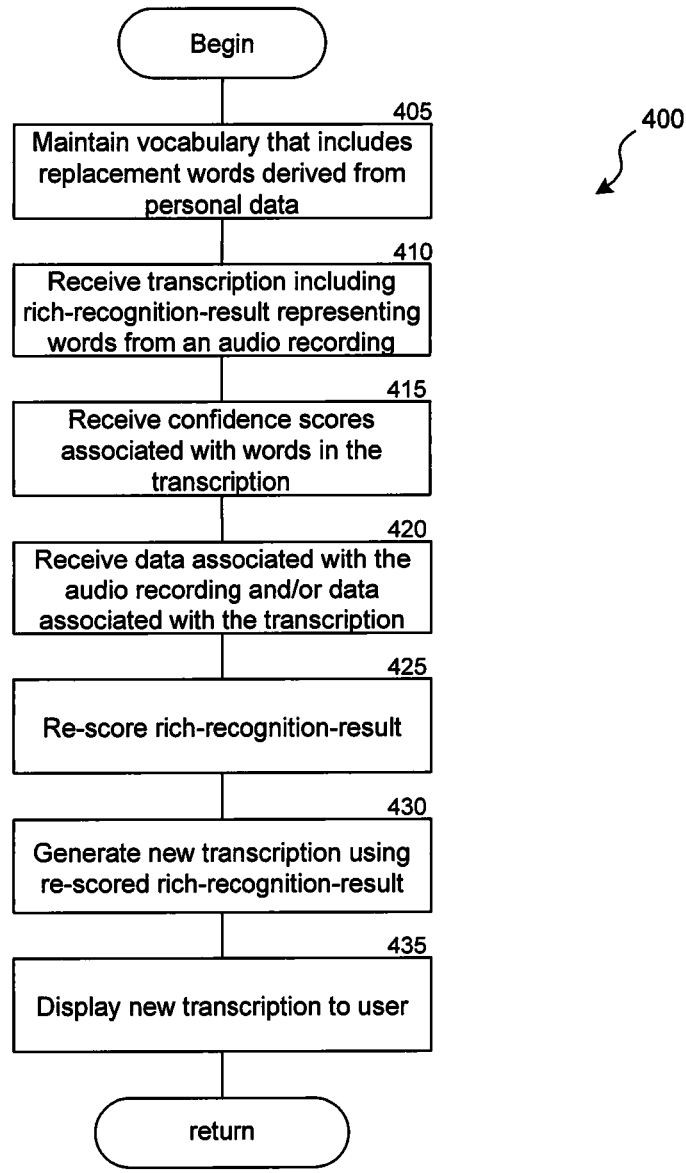
FIG. 4A is a flow diagram depicting a method performed by the personal data re-scoring system to improve the accuracy of a transcription using words derived from personal data.

FIG. 4A is a flow diagram of a process 400 implemented by the personal data re-scoring system 200 to improve the accuracy of an audio transcription generated by an ASR engine, such as the ASR engine 20 on the server accessible via the network(s) 70. As mentioned earlier, the transcription prepared by the ASR engine may include a rich-recognition-result, such as in the form of a word lattice (and possibly with other data too, as noted herein, such as a phoneme lattice). The word lattice can be represented as a graph containing arcs and nodes, from which an n-best list of words for a transcription can be determined. For example, for a particular segment of audio, the word lattice may include the words that the ASR engine identified as those that were most likely spoken and alternatives to those words. The alternative hypotheses may include full words or phonemes, and the words and phonemes may be associated with confidence scores, individually or in groups of words and phonemes. The process 400 attempts to improve the accuracy of the transcription by modifying the rich-recognition-result or data associated therewith, such as by using personal data to re-calculate confidence scores associated with words and/or phonemes of the rich-recognition-result. The process 400 then identifies a new path through the rich-recognition-result, thereby identifying a string of words that is more likely to accurately represent the words that were spoken in the audio recording than the words originally identified by the ASR engine.

The personal data re-scoring system 200 uses personal data to improve the accuracy of a transcription. At block 405, the personal data re-scoring system 200 maintains a vocabulary that includes replacement words derived from personal data. A replacement word may be unique or specific to the user or mobile device. For example, a replacement word can be a name mentioned by the user in an SMS message that does not exist in the ASR vocabulary. A replacement word can also be a common word that also exists in the ASR vocabulary. For example, a replacement word can be a restaurant name mentioned in an email that is also a common English word or a common term that the user texts frequently. The personal data re-scoring system can identify replacement words by pulling words from text or by processing personal data to generate or find replacement words. For example, the personal data re-scoring system can add words to its vocabulary that are included in messages sent and received by the user, in contact information associated with people or organizations, in websites visited by the user, or in other sources. The personal data re-scoring system can also search for words associated with personal data, such as the name of a restaurant located at an address from an SMS message or the name of a hotel associated with a phone number dialed by the user.

The personal data re-scoring system 200 also identifies and stores data associated with replacement words. In some implementations, the personal data re-scoring system tags words. For example, a replacement word can be tagged to indicate that it represents a person's name or that it was identified in an SMS message. In some implementations, the personal data re-scoring system identifies and stores data related to a word's usage. For example, the personal data re-scoring system may count and store the number of times that a replacement word appears in SMS messages sent to the user. In some implementations, the personal data re-scoring system identifies data related to a word based on how the word is used in a sentence. For example the personal data re-scoring system 200 may extract a replacement word from an SMS/MMS message and tag it as a person's name because it was used after "thanks" in the message or after the phrase "hello, this is." The personal data re-scoring system may also tag a word as being associated with a family member or frequent contact, a place or location, or the like. In some implementations, the personal data re-scoring system associates a weighting with a replacement word, indicating a relative significance of the word relative to the user. For example, a word identified as a contact's name may be weighted more heavily than a word used in an SMS message. In some implementations, the personal data re-scoring system increases or decreases a weighting associated with a word based on circumstances surrounding a recording. For example, a word extracted from an email from a particular sender may be weighted heavily when the personal data re-scoring system is analyzing a transcription of a voicemail sent by that sender, but weighted lightly for all other transcriptions.

The personal data re-scoring system can continuously update its vocabulary as new personal data is discovered or new transcriptions are received. It uses this vocabulary to improve the accuracy of received transcriptions. At block 410, the personal data re-scoring system 200 receives a transcription, including a rich-recognition-result, which represents spoken words from the audio recording and alternate hypotheses for at least some of the words as noted herein.

At block 415, the personal data re-scoring system 200 receives confidence scores associated with the transcription. As mentioned above, a confidence score can be associated with a word, phoneme, or group of words and/or phonemes. A confidence score signifies how confident the ASR engine is that it identified the actual word or words that were spoken in the audio recording. For example, the ASR engine may generate a confidence score on a scale from 0 to 1, where a confidence score of 1 means that the ASR engine is very confident that it recognized a spoken word correctly and a confidence score of 0 means that the ASR engine could not confidently identify the spoken word. As an example, FIG. 5C shows a table of confidence scores 540 associated with each word of the transcription 520. In FIG. 5C, the confidence scores are based on a scale from 0 to 1, although other scales may be used.

At block 420, the personal data re-scoring system 200 receives data associated with the audio recording and/or data associated with the transcription. In some implementations, the data associated with the audio recording includes the audio recording itself or segments thereof, such as segments of audio data that are associated with words that the ASR engine could not confidently identify. Thus, in addition to receiving the word lattice and confidence scores, the personal data re-scoring system may receive separate acoustic model (AM), language model (LM), and/or a phoneme lattice so that the system can align words from personal data with the received rich-recognition-result.

At block 425, the personal data re-scoring system 200 re-scores the rich-recognition-result. The rich-recognition-result may be re-scored by modifying confidence scores associated with words and phonemes of the rich-recognition-result and by modifying the words or phonemes of the rich-recognition-result. The rich-recognition-result can be re-scored in a number of ways. In some implementations, the personal data re-scoring system compares the rich-recognition-result, including alternative hypotheses, to replacement words derived from personal data, and re-calculates confidence scores associated with the rich-recognition-result based on this comparison. As one example, the rich-recognition-result associated with a voicemail recording may include the phrase "great crumpet," which is associated with a confidence score of 0.7. An alternative hypothesis for "great crumpet" may be the phrase, "play trumpet," which is associated with a confidence score of 0.6. "Trumpet" may be a replacement word identified by the personal data re-scoring system 200 in a text message received from the same person who recorded the voicemail. As a result, the personal data re-scoring system 200 may increase the confidence score associated with "play trumpet" to 0.9 because the phrase has a personal relevance to the user.

In some implementations, the personal data re-scoring system 200 transcribes the audio recording, or portions thereof, using a local ASR engine, which is able to use the replacement words derived from personal data to transcribe the audio. The local ASR engine may generate a rich-recognition-result that may be represented, for example, as a word lattice. In some implementations, the local ASR engine utilizes acoustic models associated with the user, which produces acoustic model scores that are scaled to compare to the acoustic model scores of the rich-recognition-result. The local ASR engine may also generate confidence scores associated with the transcription. The personal data re-scoring system 200 may compare the transcription produced by the local ASR engine to the rich-recognition-result received from the remote ASR engine and increase or reduce the confidence scores associated with the received rich-recognition-result based on the transcription and confidence scores generated by the local ASR engine. For example, the personal data re-scoring system 200 may transcribe a segment of audio that is associated with a phrase that the remote ASR engine associated with a confidence score of only 0.3. The personal data re-scoring system 200 may transcribe this segment of audio and associate a high confidence with its transcription, such as 0.9, because it recognizes the phrase as the name of a contact. The personal data re-scoring system 200 may modify the rich-recognition-result produced by the remote ASR engine so that it includes the name of the contact with a confidence score of 0.9.

As discussed herein, the personal data re-scoring system 200 may consider a number of characteristics of the personal data when modifying the rich-recognition-result or a score associated with the rich-recognition-result. For example, the personal data re-scoring system may consider a weighting, a tag, the grammatical usage of the word, or other factors, to modify the confidence score associated with a word.

After the personal data re-scoring system 200 has re-scored the rich-recognition-result, at block 430, it generates a new transcription. The new transcription identifies the words that the personal data re-scoring system determines most likely represent the words spoken in the audio recording. In some implementations, the personal data re-scoring system 200 identifies a new path through the rich-recognition-result to produce the new transcription. For example, the personal data re-scoring system 200 may identify the most accurate transcription for an audio segment by selecting words and combinations of words from a word lattice that represent the greatest combination of confidence scores associated with the audio segment.

At block 435, the personal data re-scoring system 200 displays the final transcription to the user. The personal data re-scoring system 200 may allow the user to take a number of different actions with respect to the transcription. For example, as discussed below with respect to FIG. 4B, the personal data re-scoring system 200 may provide options to the user to upload any changes that were made to the transcription to the ASR engine that originally transcribed the audio recording. Steps for performing these actions are described below with respect to FIGS. 4B and 6. Alternatively or additionally, the system can provide a list of one or more alternative words (or allow the user to select a series of options) for a word or words that the user recognizes as being incorrectly transcribed, and thereby allow the user to correct such errors.

Figure 4B:
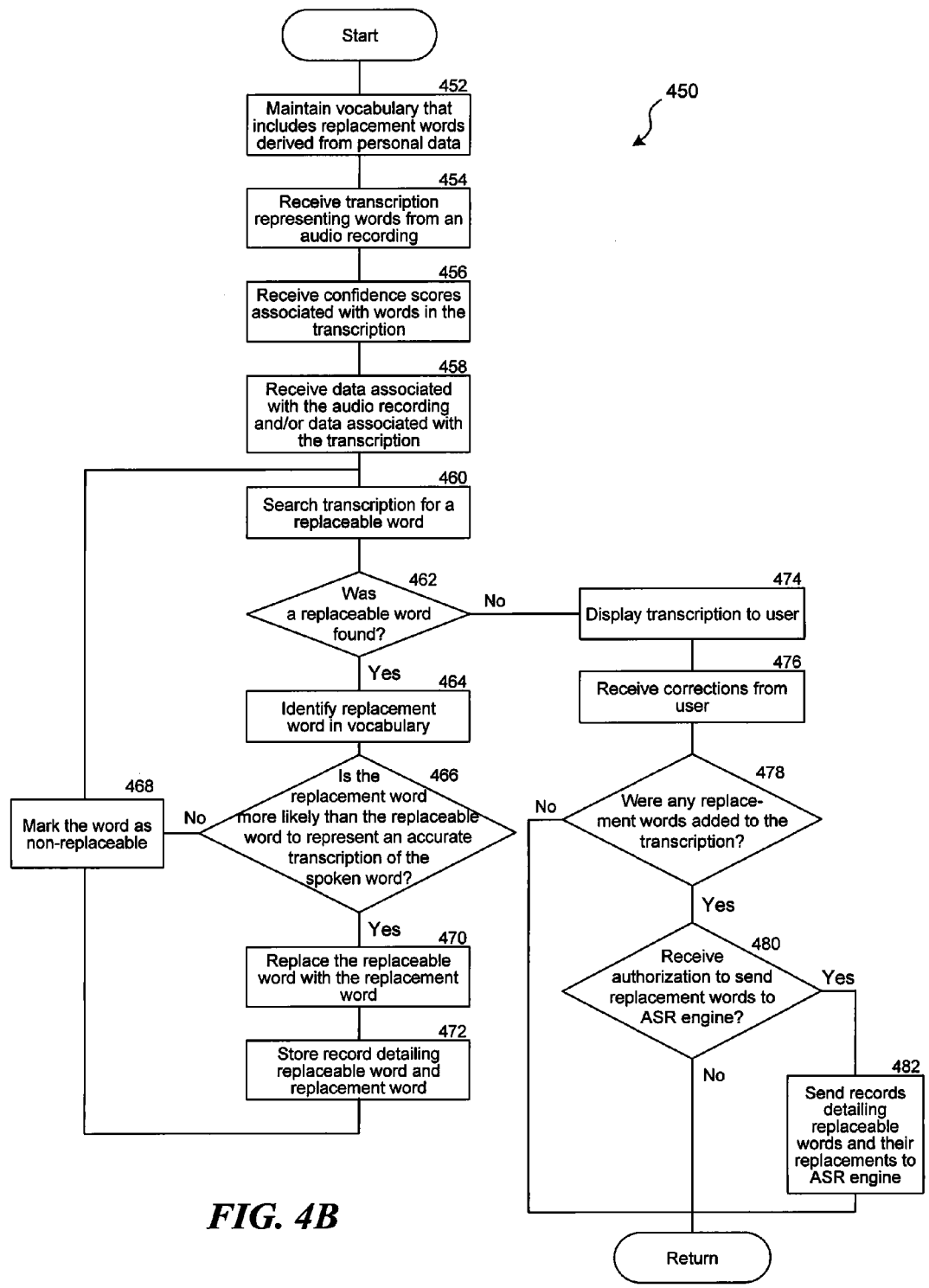
FIG. 4B is a flow diagram depicting a method performed by the personal data re-scoring system to improve the accuracy of a transcription using words derived from personal data.

FIG. 4B is a flow diagram of a process 450 implemented by the personal data re-scoring system 200 that includes alternative, additional or optional functions or operations to improve the accuracy of an audio transcription generated by the ASR engine. At blocks 452, 454, 456, and 458, the personal data re-scoring system 200 maintains a vocabulary including replacement words, receives a transcription representing words from an audio recording, receives confidence scores, and receives data associated with the audio recording. The actions taken by the personal data re-scoring system at these blocks are analogous to the actions described above with reference to blocks 405-420 of FIG. 4A.

At block 460, the personal data re-scoring system 200 searches the transcription for a replaceable word. A replaceable word is one that the personal data re-scoring system believes might be an inaccurate transcription of a spoken word from the recording. In some implementations, a replaceable word is a word whose confidence score is below a threshold level. In some implementations, the threshold level is constant throughout a transcription. For example, in the transcription 520 shown in FIG. 5B, a first incorrect transcription 505a is the word "Karen," which was transcribed instead of "Taryn." A confidence score of 0.7 is associated with "Karen." Using a confidence score threshold level of 0.8, the first incorrect transcription 505a is identified as a replaceable word because its confidence score is below the threshold level.

In some implementations, the threshold level is different for different words in a transcription. In some implementations, a threshold level is set at a value that is based at least in part on a similar word's existence in the personal data re-scoring system's vocabulary. For example, the personal data re-scoring system may assign a high threshold level to a word that has a very similar phonetic spelling as that of a word from its vocabulary. In the transcription 520 shown in FIG. 5B, a second incorrect transcription 510a is the word "Bingo's"

instead of "Binko's." The personal data re-scoring system assigns a high threshold level to "Bingo's" because it is phonetically similar to "Binko's," which exists in its vocabulary. In some implementations, a threshold level is set at a value that is based at least in part on a weighting associated with a replacement word. For example, the personal data re-scoring system may assign a higher threshold level to "Bingo's" if the word "Binko's" is weighted heavily for having been used in an SMS message sent by the user earlier in the day, or within a selectable time period (e.g., within last 48 hours).

In some implementations, a replaceable word is identified independently from its confidence score. For example, the personal data re-scoring system identifies a replaceable word as one that is phonetically similar to a word from its vocabulary that is weighted heavily. For example, a third incorrect transcription 515a is the word "Tim" instead of "Pim." The word "Pim" is heavily weighted because it is the user's name. Because of its heavy weighting, the personal data re-scoring system identifies any word that is phonetically similar to "Pim" as a replaceable word, including "Tim." In some implementations, the personal data re-scoring system 200 includes a local ASR engine that transcribes all or a segment of the audio recording and first uses, or prefers, the personal data re-scoring system's vocabulary, before relying on a more standard/generic vocabulary. It identifies a word from the received transcription as replaceable if it was able to confidently transcribe the corresponding spoken word and the new transcription is different from the received transcription. If a word in the transcription is marked as non-replaceable, the personal data re-scoring system does not consider whether it would qualify as a replaceable word.

At a decision block 462, if the personal data re-scoring system 200 finds no replaceable words in the transcription, the process 450 proceeds to block 474. At block 474, the personal data re-scoring system 200 displays the transcription to the user. In some instances, the personal data re-scoring system discovers no replaceable words because the ASR engine has accurately recognized every word from the audio recording. In other instances, the personal data re-scoring system finds no replaceable words in the transcription because all replaceable words have been replaced or marked as being non-replaceable. If the personal data re-scoring system does find a replaceable word, the process 400 proceeds to block 464.

At block 464, the personal data re-scoring system 200 identifies at least one replacement word from its vocabulary that might more accurately represent the spoken word from the audio recording. As mentioned earlier, the personal data re-scoring system may include a local ASR engine. In some implementations, in an effort to identify a replacement word, the local ASR engine transcribes audio data that the replaceable word was transcribed from. In some implementations, the personal data re-scoring system identifies a replacement word by comparing words in its vocabulary to data associated with the transcription and/or the recording. For example, data associated with a replaceable word may include a phonetic representation of the word, which the personal data re-scoring system compares to replacement words from its vocabulary. In some implementations, the personal data re-scoring system identifies a replacement word based at least in part on the replacement word being phonetically similar to the replaceable word.

At a decision block 466, the personal data re-scoring system 200 determines whether an identified replacement word is more likely than the replaceable word to accurately represent the actual or intended spoken word. In some implementations, the personal data re-scoring system 200 favors a word with a higher confidence score. For example, the personal data re-scoring system may assign a confidence score to a replacement word, which can be based, for example, on a comparison of the replacement word's phonetic spelling and the replaceable word's phonetic spelling. If the replacement word's confidence score is higher than that of the replaceable word, the personal data re-scoring system concludes that it better represents the spoken word from the recording.

In some implementations, the personal data re-scoring system considers a weighting associated with a replacement word to determine whether it better represents the spoken word. This weighting may be the same as the weighting described above with respect to block 460. For example, the personal data re-scoring system may favor a word with an extremely heavy weighting, such as the user's name.

In some implementations, the personal data re-scoring system considers the transcription's sentence structure or grammar to determine whether a replacement word better represents the spoken word. For example, the personal data re-scoring system may favor a word that makes a sentence grammatically correct over one that does not.

In some implementations, the personal data re-scoring system favors a replacement word that has been substituted into previous transcriptions sent to the user or from the person who recorded the recording. For example, if "Pim" is consistently misrecognized by the ASR engine, the personal data re-scoring system may determine that "Pim" better represents a spoken word than "Tim," which the ASR engine consistently identifies instead of "Pim." If the personal data re-scoring system determines that the replaceable word represents the spoken word better than the replacement word, it makes no changes to the transcription, and the process 450 proceeds to block 468, and the personal data re-scoring system marks the replaceable word as non-replaceable.

If the personal data re-scoring system determines that a replacement word has a greater likelihood of representing the spoken word, the process proceeds to block 470. At block 470, the personal data re-scoring system 200 replaces the replaceable word with the replacement word it determines has the greatest likelihood of representing the spoken word. At block 472, the personal data re-scoring system stores a record of the replaceable word and replacement word. In some implementations, this record is used to improve future transcriptions that are sent by the ASR engine. The process 450 proceeds to block 468, and personal data re-scoring system marks the new transcription as non-replaceable.

When no replaceable words remain in the transcription, the process proceeds to block 474. At block 474, the personal data re-scoring system 200 displays the final transcription to the user. In some implementations, the personal data re-scoring system 200 identifies which words from the transcription it changed. For example, FIG. 5D shows a diagram of a final transcription 560 of the received audio that is represented in the diagram 500 in FIG. 5A. The words "Binko's" and "Pim" are underlined, indicating that these words are replacement words. In some implementations, the personal data re-scoring system identifies all words that were originally identified as replaceable. For example, the personal data re-scoring system may highlight the word "Karen" in some way to designate that it was a replaceable word that did not get replaced. At block 465, the personal data re-scoring system receives corrections from the user. For example, the personal data re-scoring system may generate a user interface from which the personal data re-scoring system can receive the user's input. In FIG. 5D, the personal data re-scoring system displays a window 525 that lists alternative transcriptions of "Karen"

when the word "Karen" is selected. The user may select a word from the window 525 to replace the existing the transcription. A user may also indicate that he or she does not wish to change the transcription.

At a decision block 478, the personal data re-scoring system determines whether it added any replacement words to the transcription. If it did not add replacement words to the transcription, the process 450 returns. If the personal data re-scoring system did add replacement words to the transcription, the process 450 proceeds to a decision block 480. At decision block 480, the personal data re-scoring system determines whether it has received authorization from the user to send a report to the ASR engine. The report may include data related to the transcription, including replacement words that were added and replaceable words that were removed. The personal data re-scoring system may, for example, collect this data at block 472. If it has not received authorization from the user to upload the report, the process 450 returns. In some implementations, the personal data re-scoring system seeks a user's approval by generating a graphical user interface, through which the user may authorize the system to upload the report. If the user has authorized the personal data re-scoring system to send the report to the ASR engine, at block 482, the personal data re-scoring system sends the report to the ASR system, and the process 450 returns.

Figure 6:
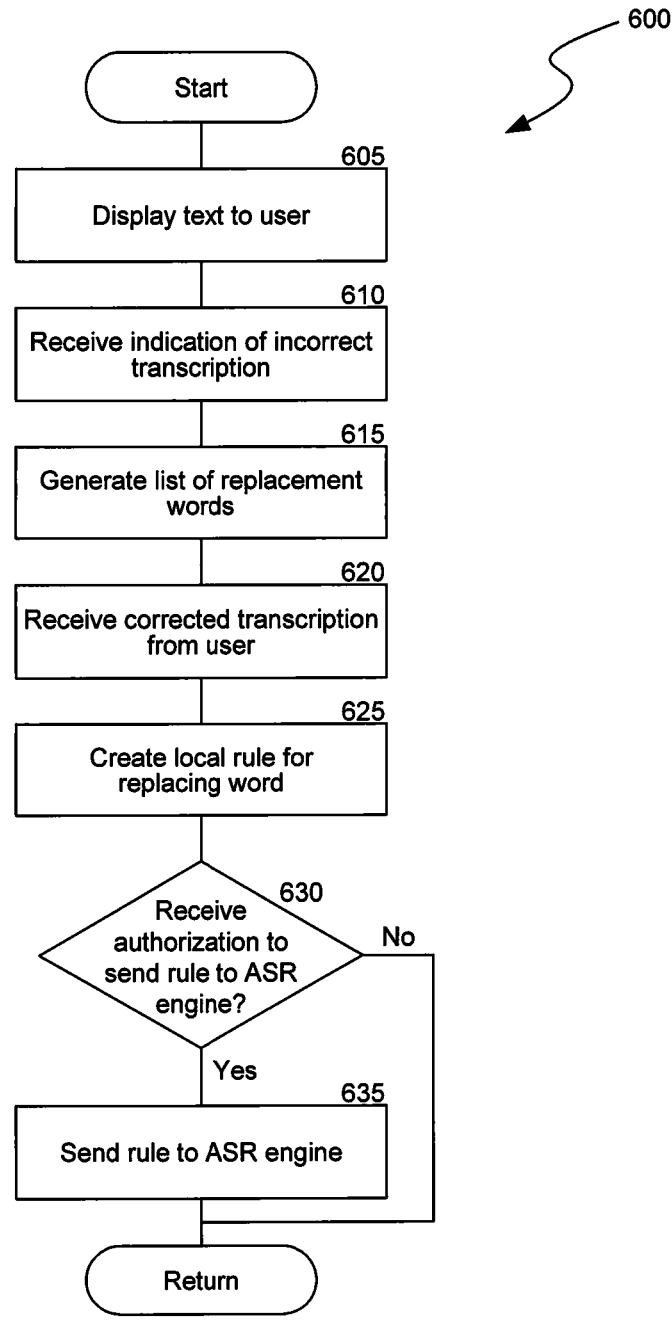
FIG. 6 is a flow diagram depicting a method performed by the personal data re-scoring system to correct an incorrect transcription.

FIG. 6 is a flow diagram of a process 600 implemented by the personal data re-scoring system 200 to correct an inaccurate transcription of a word. At block 605, the personal data re-scoring system 200 displays a transcription to a user. The transcription includes an inaccurate transcription of a spoken word from an audio recording. The inaccurate transcription may be a replacement word that was added to the transcription by the personal data re-scoring system 200. It could be another word, such as one that the personal data re-scoring system did not even identify as replaceable. At block 610, the personal data re-scoring system 200 receives an indication from the user that a word in the text has been inaccurately transcribed. In some implementations, the user selects the word that has not been accurately transcribed. At block 615, the personal data re-scoring system generates a list of replacement words and displays the list to the user. The user may select a word from this list to correct the transcription. In some implementations, the personal data re-scoring system permits the user to enter a custom replacement word. At block 620, the personal data re-scoring system receives a corrected transcription from the user.

At block 625, the personal data re-scoring system creates a local rule for replacing the inaccurate transcription with the corrected transcription submitted by the user. For example, when attempting to improve the accuracy of future transcriptions, the personal data re-scoring system may automatically replace the replaced inaccurate word with the corrected transcription. At a decision block 630, the personal data re-scoring system determines whether it has received approval from the user to send the local rule to the ASR engine. For example, the personal data re-scoring system may generate a user interface that includes a field that the user can select to authorize the personal data re-scoring system to upload the rule to the ASR engine. If authorization from the user has not been received, the process 600 returns. If authorization from the user has been received, the process 600 proceeds to block 635. At block 635, the personal data re-scoring system sends the rule to the ASR engine.

Described herein is a personal data re-scoring system that improves the accuracy of a received transcription by replacing words in the transcription with words derived, e.g., from personal data associated with a user. An automatic speech recognition (ASR) engine transcribes spoken words from an audio recording using an ASR vocabulary. The personal data re-scoring system maintains a vocabulary that includes replacement words that are derived from personal data. The personal data re-scoring system receives the transcription of the audio recording and data associated with the transcription, such as confidence scores associated with words from the transcription. The personal data re-scoring system identifies words in the transcription that may have been inaccurately transcribed by the ASR engine. The personal data re-scoring system replaces an identified word with a replacement words that is more likely than the identified word to accurately represent the spoken word.

Aspects of the invention include a system for replacing one or more words in a transcription generated by an automatic speech recognition (ASR) engine, where the system includes a processor and a memory. The system includes a vocabulary maintenance component implemented by the processor and configured to maintain a personal vocabulary that includes replacement words, where the replacement words in the personal vocabulary are obtained from auxiliary data associated with a user, the auxiliary data is obtained from data sources associated with the user, and the personal vocabulary is separate from an ASR vocabulary associated with the ASR engine. The system includes a communication component configured to: 1) receive a transcription of an audio recording, where the transcription is generated by the ASR engine using the ASR vocabulary, and where the transcription includes a transcribed word that represents a spoken word in the audio recording, and 2) receive data associated with the transcribed word, where the data associated with the transcribed word includes a confidence score, and where the confidence score is generated by the ASR engine. The system also includes a word replacement component implemented by the processor and configured to: identify a replacement word from the personal vocabulary; and replace the transcribed word with the replacement word. The system can be part of a mobile phone or tablet, and the ASR engine can be located geographically remotely from the portable computing system. The auxiliary data is obtained from stored contact data for the user, stored calendar data for the user, or text-based messages sent or received by the user, the communication component is further configured to receive audio data that includes the spoken word; and the system further includes an ASR component configured to generate a second transcription using the audio data, wherein the second transcription is generated using the personal vocabulary and the second transcription includes the replacement word.

CONCLUSION

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the blocks may be rearranged, blocks may be performed in parallel, blocks may be omitted, or other blocks may be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, and the assignee's U.S. patent application Ser. No. 13/101,909, filed May 5, 2011 and Ser. No. 13/101,085, filed May 4, 2011, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A personal computing device for use with a remote automatic speech recognition engine, the device comprising:
   a communications port configured to receive a data set and audio data from the remote automatic speech recognition engine,
      wherein the data set and the audio data reflect speech,
      wherein the data set is a rich data set that includes a word list for candidate words with confidence scores, and
      wherein the data set is generated by the remote automatic speech recognition engine in response to the audio data;
   a display device for displaying information to a user;
   memory for at least temporarily storing personal data and executable code for a re-recognition engine,
      wherein the re-recognition engine includes automatic speech recognition capability; and
   at least one processor coupled among the communications port, the display device, and the memory,
      wherein the at least one processor is configured to execute the code for the re-recognition engine and—
         access the personal data from the memory,
         generate a local transcription using the audio data, wherein the local transcription is generated using the speech recognition capability of the re-recognition engine and the accessed personal data,
         rescore the data set received from the remote automatic speech recognition engine, using the re-recognition engine, based on the accessed personal data and confidence scores associated with the local transcription,
         generate a final transcription of the speech using the rescored data set and the local transcription,
         present, via the display device, the final transcription of the speech to the user based on the rescored data set and local transcription, and
         create a rule that a particular word in the data set from the remote automatic speech recognition engine is to be replaced by a particular replacement word from the local transcription, and transmit, via the communications port, the rule or the rescored data set to the remote automatic speech recognition engine from which a vocabulary of the remote automatic speech recognition engine is modified,
      wherein the remote automatic speech recognition engine is hosted by a server accessible via a network, and the personal computing device is a cell phone, smart phone, tablet or portable telecommunications device.

2. The personal computing device of claim 1 wherein the data set further comprises a word lattice or a phoneme lattice.

3. The personal computing device of claim 2 wherein the data set includes a language model associated with the user.

4. The personal computing device of claim 1 wherein the personal data includes at least one acoustic model associated with the user.

5. The personal computing device of claim 1 wherein the personal data includes at least one of: address book information, text-based messages, and data from web-based sources.

6. A method of generating a secondary transcription from a primary transcription generated by a remote automatic speech recognition (ASR) engine, wherein the method is performed by a computing system having a processor and a memory, the method comprising:
   maintaining a personal vocabulary that includes replacement words,
      wherein the replacement words in the personal vocabulary are obtained from personal data associated with a user;
   receiving primary transcription data from an audio recording,
      wherein the primary transcription data is generated by the remote ASR engine using an ASR vocabulary;
      wherein the primary transcription data includes a primary transcription and confidence scores associated with words in the primary transcription, and
      wherein the confidence scores are generated by the remote ASR engine;
   receiving audio data that corresponds at least in part to a portion of the received primary transcription data;
   generating a local transcription using the audio data, wherein the local transcription is generated by a local ASR engine at the computing system using the personal vocabulary;
   identifying at least one replacement word from the local transcription;
   comparing the replacement word to at least a portion of the received primary transcription;
   producing a modified score associated with the portion of the received primary transcription based at least in part on the comparison;
   generating a secondary transcription using the modified score, wherein the secondary transcription includes at least the one replacement word and the replacement word appears in the secondary transcription in place of at least one word from the primary transcription; and
   creating a rule that a particular word in the data set from the remote speech recognition engine is to be replaced by a particular replacement word from the secondary transcription, and transmitting the rule or the modified score to the remote ASR engine from which a vocabulary of the remote ASR engine is modified.

7. The method of claim 6, comprising:
   receiving a rich-recognition-result for the portion of the received primary transcription data; and
   modifying the score based at least in part on the local transcription.

8. The method of claim 6, wherein the received primary transcription data includes a rich-recognition-result with phoneme data associated with the audio recording.

9. The method of claim 6, wherein the replacement word is associated with a weighting, and wherein the weighting is indicative of a relative significance of the replacement word to the user.

10. The method of claim 6, wherein the personal data associated with the user includes data from one of an SMS or MMS message, an email, a contact, or a social network.

11. The method of claim 6, wherein the received primary transcription data includes a word lattice and generating the secondary transcription comprises finding a path through the word lattice that is different from a path through the word lattice that was used to generate the primary transcription.

12. The method of claim 6, wherein the replacement word is associated with a tag, and wherein the tag identifies that the replacement word is associated with one of a name, a location, or a family member or frequent contact.

13. The method of claim 6, further comprising obtaining user approval prior to forwarding the report to the remote ASR engine.

14. A method of replacing one or more words in a transcription generated by a remote automatic speech recognition (ASR) engine, wherein the method is performed by a personal computing system having a processor and a memory, the method comprising:
   maintaining a personal vocabulary that includes replacement words;
      wherein the replacement words in the personal vocabulary are obtained from personal data associated with a user; and
   receiving a transcription of an audio recording,
      wherein the transcription is generated by the remote ASR engine using an ASR vocabulary,
      wherein the ASR vocabulary is separate from the personal vocabulary, and,
      wherein the transcription includes at least one transcribed word that represents at least one spoken word in the audio recording;
   receiving data associated with the transcribed word, wherein the received data is a rich data set that includes a word lattice, confidence scores, and a phoneme lattice;
   receiving audio data that includes the spoken word;
   generating a second transcription using the audio data, wherein the second transcription is generated by a local ASR engine using the personal vocabulary to rescore the rich data set;
   identifying a replacement word from the second transcription;
   replacing the transcribed word with the replacement word; and
   creating a rule that a particular word in the data set from the remote ASR engine is to be replaced by the replacement word from the second transcription and transmitting the rule or the rescored rich data set to the remote ASR engine from which a vocabulary of the remote ASR engine is modified;
   wherein the personal computing system is a mobile phone or tablet, wherein the remote ASR engine is located geographically remotely from the personal computing system; and
   wherein the replacement word is from the personal vocabulary.

15. A method of replacing one or more words in a transcription generated by a remote automatic speech recognition (ASR) engine, wherein the method is performed by a portable computing system having a processor and a memory, the method comprising:
   maintaining a personal vocabulary that includes replacement words;
      wherein the replacement words in the personal vocabulary are obtained from personal data associated with a user; and wherein the personal data is obtained from:
 stored contact data for the user,
 stored calendar data for the user,
 text-based messages sent or received by the user; or
 a social network of which the user is a member,
receiving a transcription of an audio recording,
 wherein the transcription is generated by the remote ASR engine using an ASR vocabulary,
 wherein the transcription includes a transcribed word that represents a spoken word in the audio recording, and
 wherein the remote ASR engine is located geographically remotely from the portable computing system;
receiving data associated with the transcribed word,
 wherein the data associated with the transcribed word includes a word lattice and associated confidence scores, and
 wherein the confidence scores are generated by the remote ASR engine;
receiving audio data that includes the spoken word;
generating a second transcription using the audio data,
 wherein the second transcription is generated by a local ASR engine using the personal vocabulary and re-scores the word lattice;
identifying a replacement word from the second transcription; and
creating a rule to automatically replace the transcribed word with the replacement word whenever the transcribed word is found in a transcription, and transmitting the rule or the re-scored word lattice to the remote ASR engine from which a vocabulary of the remote ASR engine is modified;

wherein the portable computing system is a mobile phone or table, and wherein the replacement word is from the personal vocabulary.

16. The method of claim 15, wherein the replacement word is associated with a confidence score that is greater than a confidence score associated with the transcribed word, and wherein the confidence score of the transcribed word is less than a threshold confidence level.

17. The method of claim 15, wherein the replacement word is associated with a weighting, and wherein the weighting is indicative of a relative significance of the word to the user.

18. The method of claim 15, wherein the data associated with the transcribed word includes a phonetic spelling of the transcribed word.

19. The method of claim 15, wherein the transcription includes metadata including a phone number or electronic address of a person, and wherein the replacement word is associated with a name of the person from the contact for the user.

20. The method of claim 15, wherein the replacement word is associated with a tag, and wherein the tag identifies that the replacement word is associated with one of a name, a location, or a family member or frequent contact.

21. The method of claim 15, further comprising obtaining user approval before sending the report to the remote ASR engine.

22. The method of claim 15, further comprising receiving a selection from the user of the replacement word, wherein upon the selection from the user, the replacement word is substituted in the transcription for the transcribed word.

23. The method of claim 15, wherein the threshold confidence level depends at least in part on a weighting associated with the replacement word.

* * * * *